US00H002147H

(19) United States
(12) Statutory Invention Registration
Ross

(10) Reg. No.: US H2147 H
(43) Published: Mar. 7, 2006

(54) DIGITAL PREEMPHASIZER FOR TRANSMISSION OF PCM CODES

(75) Inventor: Jerry H. Ross, Waveland, MS (US)

(73) Assignee: The United States of America as represented by the Secretary of the Navy, Washington, DC (US)

(21) Appl. No.: 09/839,600

(22) Filed: Apr. 23, 2001

(65) Prior Publication Data

US 2002/0154701 A1 Oct. 24, 2002

(51) Int. Cl.
*H04B 14/04* (2006.01)

(52) U.S. Cl. ..... 375/254
(58) Field of Classification Search ..... None
See application file for complete search history.

(56) References Cited

U.S. PATENT DOCUMENTS

2002/0154701 A1 * 10/2002 Ross ..... 375/254

* cited by examiner

*Primary Examiner*—Daniel Pihulic
(74) *Attorney, Agent, or Firm*—Barry A. Edelberg; Charles J. Stockstill

(57) ABSTRACT

A method for digital preemphasizer high fidelity reconstruction of an original pulse code modulation (PCM) serial stream binary data signal which has suffered degradation of fidelity, and consequent increase in bit-error-rate, during transmission on a single channel from a transmitter to a receiver. Prior to transmission, amplitude encoded digital pre-emphasis of each bit of the original binary data signal to be transmitted mitigates or remedies the signal degrading frequency dependent losses concomitant with the signal transfer network characteristics of the fixed transmission line. Subsequently, the amplitude encoded signal is transmitted to the receiver connected to the other end of the fixed transmission line. Compared to a conventional transmitter, transmision line, and receiver system, the end result of amplitude encoded pre-emphasis is superior reconstructed fidelity and quality of the PCM waveform, i.e. lower bit-error-rate, at the output of the receiver for the same length of transmission line.

8 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DIGITAL PREEMPHASIZER FOR TRANSMISSION OF PCM CODES

BACKGROUND OF THE INVENTION

1. Field of the Invention

The present invention, disclosed hereinafter, concerns generally an apparatus and method for reducing signal errors attendant to pulse or digital communications transmitted along lossy, band-limited, time-invariant, fixed length, single channel transmission path. In particular, the present invention provides apparatus and method for reducing the error-rate of digital PCM (pulse code modulation) data by means of preemphasis precoding or encoding of the binary PCM data signal prior to transmission on a single channel of a cable system.

2. Description of the Related Art

The electronic transmission of data and information by means of pulse and digital systems typically involves either a variable path, such as a radio link between a cellular or cordless is telephone and a repeater node, or alternatively, a fixed, time variant path, such as a copper fiber optic cable connecting a cable television subscriber's receiver to a provider's distribution transmitter.

The present invention concerns the latter fixed path. For fixed path cable transmissions, the fidelity, i.e. veracity, of the transmitted data or information is limited by the bandwidth characteristics (also called transfer characteristics, impulse response) of the equivalent, passive network representing each channel of the transmission line. In many cases, a transmission line for pulse and digital communications can feature multiple channels, permitting separate clocking and error correction channels for each data channel; however, in some cases, exigent economic and physical demands prescribe a minimal size, single channel cable or path for each data or information stream. These constraints foreclose the option of a separate clocking or timing channel. Also, there may be constraints to the low frequency response of the designed transmission system. To remedy or mitigate these channel availability and frequency response constraints bi-phase level, self clocking PCM techniques are commonly employed. Unfortunately, such codes effectively reduce the available data and information bandwidth by half. These issues and associated remedies are discussed in "Digital Recording Methods", Magnetic Tape Recording Technical Fundamentals, Datatape Incorporated, 1976, pages 9599, incorporated by reference herein for purposes of indicating the background of the invention and illustrating the mature state of the art. The rationale and utilization of bi-phase PCM technology is well known to those practicing the art.

FIG. 1 illustrates a typical prior art, single channel, digital PCM data transmission system.

Biphase PCM Waveforn-21 is the digital PCM data input to Buffer AmplifieI22, representing a simple transmitter, comprising either digital or analog circuitry. A Fixed Transmission Line 23, featuring a single conductor per channel, each channel exhibiting both resistive and frequency dependent attenuation, conducts the output signal from Buffer Amplifier 22 to the input of simplified, typical Receiver 24, comprising Wide-band Amplifier25 and Multipole Equalization Network 26. Wide-band Amplifier25, employing either analog or digital circuitry, is used to compensate for the attenuation of Waveforri21 upon transmission through the lossy Fixed Transmission Line 23. Output from Wide-Band Amplifier 25 thereupon goes to the input of Multipole Equalization Network 26. Although typically an active network Multipole Equalization Network 26 can also be a passive network. Intended to reconstruct the degraded fidelity of the signal present at the input to Receiver 24 to a replication of Waveform 21 by compensating for the frequency dependent losses attendant to the Fixed Transmission Line 23, Network 26 tends to be complex and difficult to implement. Although Network 26 may also include some techniques to correct the slope or rise time of the attenuated received signal, such techniques are often primitive and inadequate for reliable, high-quality digital PCM data transmission. This inadequacy typically is remedied by Bit Synchronizer 27, which processes the output from Multipole Equalization Network 26, correcting for slope and rise time degradation, and producing as an output, Reconstructed PCM Waveform28, which is desired to be a replication of Bi-phase PCIVI Waveform 21 of sufficient veracity and reliability to fulfill the intended purpose of the data transmission system. Unfortunately, as illustrated in FIG. 1, Bit Synchronizer 27 is normally a separate, often necessary, add-on component to the typical receivef24. Containing expensive, complex circuitry, this synchronizer component can cost thousands to tens of thousands of dollars; proper utilization often entails lengthy, difficult adjustments,

SUMMARY OF THE INVENTION

An object of the present invention is to provide a means for high fidelity reconstruction, i.e. low, acceptable bit error-rate, of an original pulse code modulation (PCM) serial stream binary data signal which has suffered degradation of fidelity, and consequent increase in bit-error-rate, during transmission on a single channel from a transmitter to a receiver, connected to each other by a transmission line exhibiting both resistive and frequency dependent loss. This object is accomplished prior to transmission by amplitude encoded digital pre-emphasis of each bit of the original binary data signal to be transmitted in such manner as to mitigate or remedy the signal degrading frequency dependent losses concomitant with the signal transfer network characteristics of the fixed transmission line. Subsequent to this pre-emphasis process, the amplitude encoded signal is transmitted to the receiver connected to the other end of the fixed transmission line. Compared to a conventional transmitter, transmission line, and receiver system, the end result of amplitude encoded pre-emphasis is superior reconstructed fidelity and quality of the PCM waveform, i.e. lower bit-error-rate, at the output of the receiver for the same length of transmission lie or, alternatively, a longer transmission line for the same bit error-rate.

A further object of the present invention is to reduce the complexity and cost of signal processing equipment at the receiver while maintaining a low, acceptable bit error-rate. As a consequence of employing the present invention, the excellent high fidelity reconstruction of the received, amplitude encoded signal obviates many requirements for complex, expensive signal processing equipment at or following the receiver, such as bit synchronizers, filters, equalizers, and compensators.

DESCRIPTION OF THE PREFERRED EMBODIMENT

Figure 1:
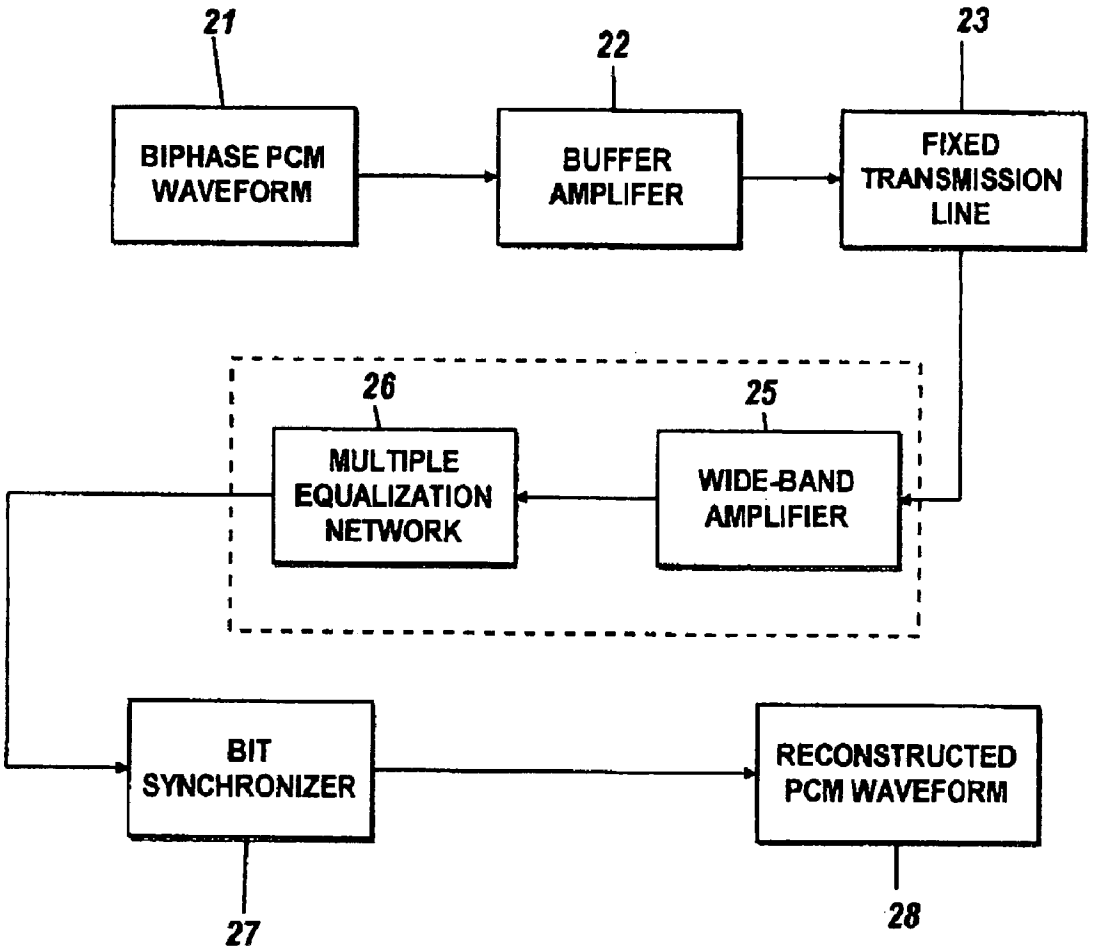
PRIOR ART FIG. 1
FIG. 1 is a simplified block diagram illustrating a typical prior art, single channel, digital PCM transmission system utilizing a bi-phase PCM waveform.

The present invention amplitude encodes the serial stream binary PCM data signal containing digital PCM data which is to be transmitted to the receiver via a fixed transmission line. This encoding modifies the signal waveform by altering the individual amplitudes of each pulse-width interval prior to transmission. The present invention is particularly suited for performing digital pre-emphasis on the bi-phase level type binary serial PCM codes or the Delayed Modulation family of PCM codes. Individual amplitudes of these binary, pulse width intervals, commonly called Mark and Space, are manually or automatically mapped into series of discrete, constant amplitude steps, mitigating or remedying the undesired frequency dependent attenuation characteristics of the transmission line. The resultant encoded signal, which now varies in amplitude steps, is then transmitted through the transmission line. Upon transmission, frequency dependent characteristics of the transmission line degrade the transmitted data signal to an extent which is opposite to the mapped characteristics of the pre-emphasized signal prior to transmission. By compensating for the transmission line frequency dependent loss affecting digital PCM data, the present invention substantially reduced the increased bandwidth penalty imposed thereon and the received, amplitude encoded, signal is more easily de-commutated and reconstructed with greater fidelity, i.e. reduced bit-error-rate, than a similar signal lacking this pre-emphasis. The resulting effect at the receiver is a constant amplitude signal, essentially the original, albeit attenuated, digital PCM data signal prior to amplitude encoding. This received attenuated signal then requires only simple amplification to provide an amplitude level sufficient commutation (e.g., threshold detection) and subsequent reconstruction of the original digital PCM data. The present invention can be easily incorporated and operated with any transmission line network characteristic and length.

The present invention simplifies receiver electronics and permits increasing the length of cable linking the transmitter and the receiver without sacrificing increased degradation of the received PCM signal. Typically, PCM signals are transmitted through a cable with only single-pole pre-emphasis for improving transmission spectral characteristics. Multi-pole pre-emphasis can sometimes be utilized, however a change in the type of cable or cable length and its associated transmission spectral characteristics typically requires modification or redesign of the pre-emphasis applied to the signal. The same condition, and generally more severe and sophisticated, is the equalization or de-emphasis network at the receiver. Such networks, which can become quite complex, would require modification and redesign to restore the signal to a usable level if cable characteristics change or if the system is utilized on a different cable.

EXAMPLE 1

An example of the utility of the present invention entails the employment of oceanographic data systems which transmit data through very long cables from a towed, submerged electronics package. Different ships utilize different types and lengths of cables and such cables have changing characteristics over time or under alternating operating conditions. The elegant simplicity and utility of this exemplary embodiment of the present invention is illustrated in a signal degradation problem that occurred when high speed serial digital PCM data were transmitted through a 7,500 meter coaxial cable connecting a submerged oceanographic data acquisition system to a recording subsystem located on board the towing ship.

Self-clocking PCM signals (synchronous or asynchronous) commonly utilize coding schemes like the family codes for Bi-phase and Delayed Modulation when transmitting serial data through single-ended cable. At the shipboard receiver, the degraded signal suffered from, (1) base-band attenuation (in this example, more than −50 dB at I MHz); (2) additional attenuation of the high frequency band component for Bi-phase; and (3) considerable DC baseline shifting.

Adequately receiving such degraded signals required expensive Synchronizers (one such unit cost in excess of $10,000) and De-commutators for extracting useable data from the signal stream. Also included at the receiver were amplifiers and equalization circuits to compensate for signal attenuation and degraded fidelity.

To minimize or eliminate the need for such complex, expensive equalization and signal is reconstruction at the receiver, the present invention was incorporated into the oceanographic data gathering system to improve signal restoration and consequently, decrease the bit-error-rate. Although the PCM signal therefrom became adversely modified by the cable due to cable characteristics, altering the DC signal baseline and the amplitudes of both high and low frequency band components, the present invention compensated for the cable response characteristics by applying a manually calibrated, multiple stepped, amplitude level adjustment to the PCM signal prior to transmission. As a result of the employment of the present invention, less varying DC baseline and nearly flat amplitude for all frequency and components was received. Laboratory testing demonstrated no data loss at transmission rates of 1–2 MHz through 7,500 m of cable for more than 60 hours of continuous transmission.

In summary, the present invention eliminated the need for conventionally employed Bit-Synchronizer and De-commutator electronics and improved the bit-error-rate by several orders of magnitude.

Figure 2:
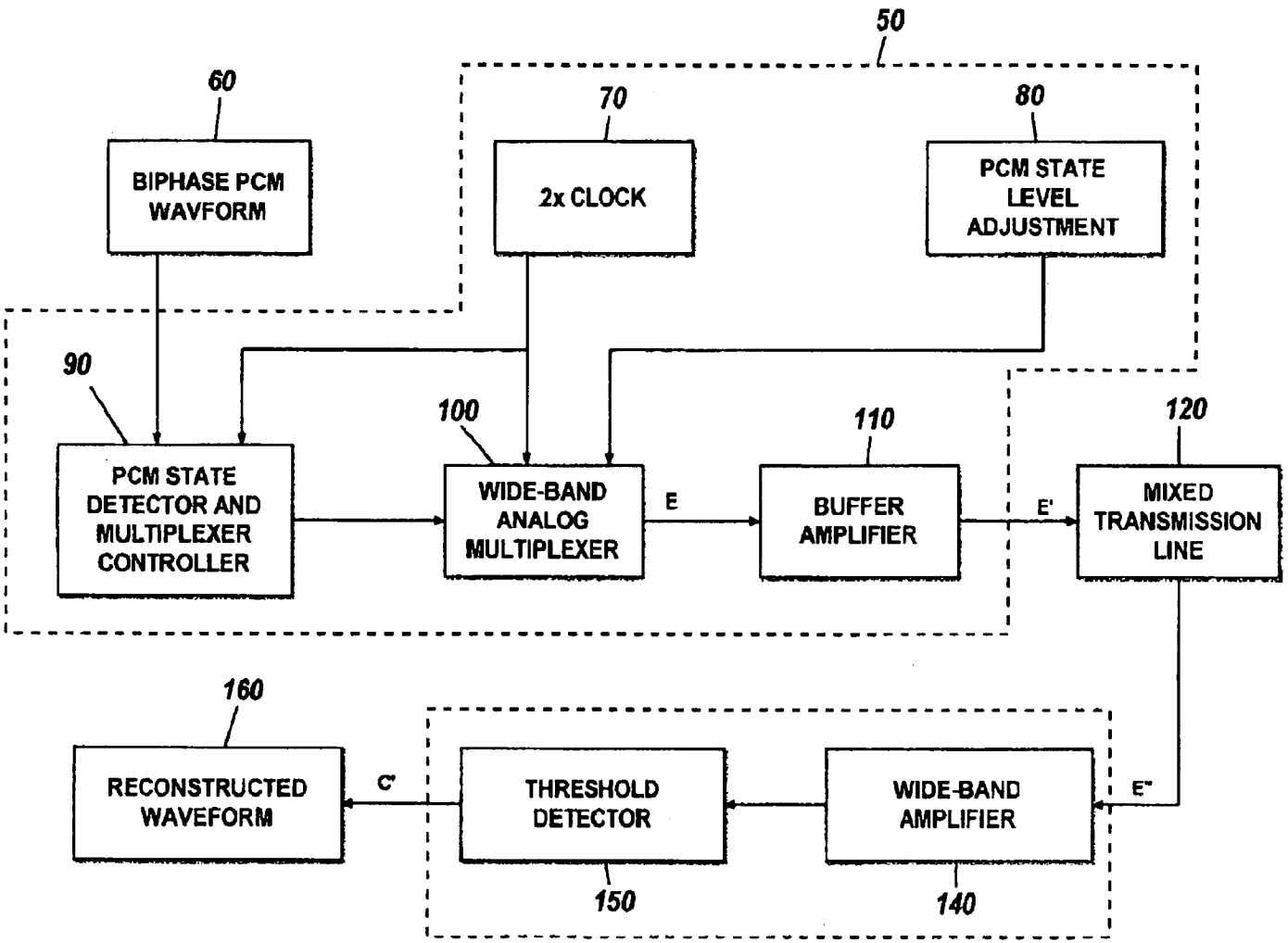
FIG. 2 is a simplified block diagram illustrating one embodiment of bi-phase PCM waveform pre-emphasis circuitry in accordance with the principles of the present invention.
Figure 3:
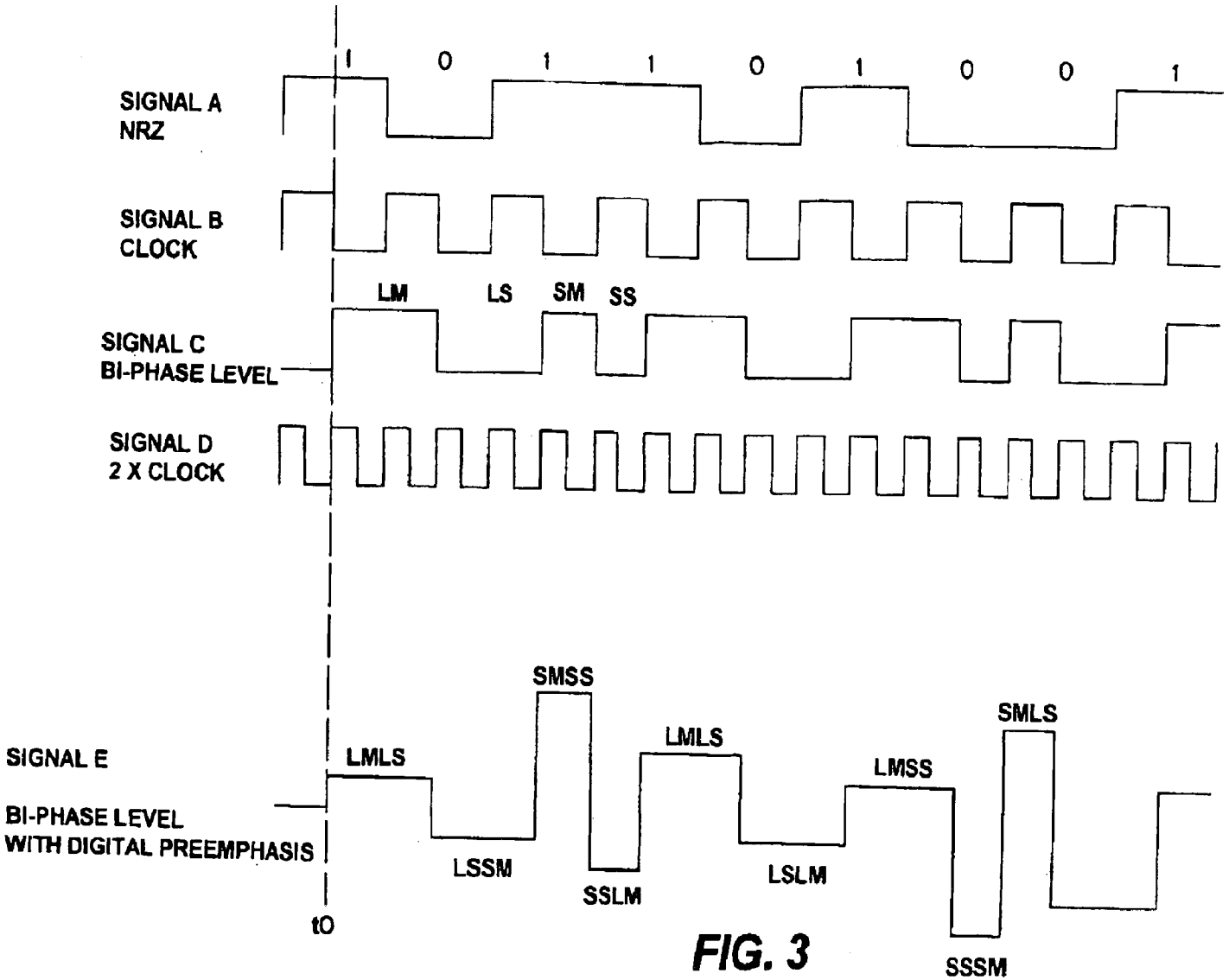
FIG. 3 is a timing diagram illustrating various waveforms attendant to the present invention.

To facilitate comprehending this particular and preferred embodiment of the present invention, FIG. 2 illustrates, in block diagram form, a digital PCM data transmission system incorporating the present invention. FIG. 2 shows the transmitter section connected to the Fixed Transmission Line 120, which, in turn, is connected to the receiver section 130. Bi-phase PCM waveform 60 represents the digital PCM data input to transmitted 50 and Reconstructed Digital PCM Waveform 60 represents the output of received 30, the desired replication of the digital PCM data input. Also included in FIG. 2 are signals C, D, E, E', E", and C'. FIG. 3 portrays some of these various concomitant binary and analog waveforms associated with the present invention. The input Bi-phase PCM Waveform 60 is exemplified in FIG. 3 as Signal C, Bi-phase Level. As illustrated in FIG. 3, Signal C is the resultant product of combining Signal A, an NRZ (non-return to zero) signal containing data or information, and Signal B, a clock signal for synchronizing data flow. Techniques for combining Signal A and Signal B into Signal C are common and well known to those practicing the art. Signals A, B, C, and D are binary signals, whereas signal E is an analog signal appearing as a series of discrete, stepped amplitude levels. Signal D is a binary signal operating at twice the frequency of Signal B; and Signal E illustrates the pre-emphasized, multiple step level, analog bi-phase signal in accordance with the present invention. Signal E' is an amplified version of Signal E; Signal E" is an attenuated version of Signal E.

As illustrated in FIG. 3, and common to those practicing the art, the pulse width interval of the bi-phase level, Signal C, may be categorized in one of four possible states, Long Mark, (designated: LM)—The longer duration of two possible binary signal levels designated as a Mark, the Mark level typically more positive than the alternative level designated as a Space Long Space (designated—LS): The longer duration of two possible binary signal levels designated as a Space, the Space level typically less positive than the alternative level designated as a Mark Short Mark (designated, SM): The shorter duration of two possible binary signal levels designated as a Mark Short Space (designated: SS)—The shorter duration of two possible binary signal levels designated as a Space Grouping together these four possible states as adjacent pairs of Space Mark or Mark Space states produces a new universe of 8 possible paired states:

Long Mark followed by Long Space, designated: LM LS

Long Mark followed by Short Space, designated: LIVISS

Short Mark followed by Long Space, designated—SIVILS

Short Mark followed by Short Space, designated: SMSS

Long Space followed by Long Mark, designated: LSLM

Long Space followed by Short Mark, designated: LSSM

Short Space followed by Long Mark, designated—SSLM

Short Space followed by Short Mark, designated: SSSM

These 8 possible conditions of level or states constitute the universe of mapped phase levels with digital preemphasis in accordance with the preferred embodiment of the present invention, illustrated in FIG. 3 as Signal E.

Figure 5:
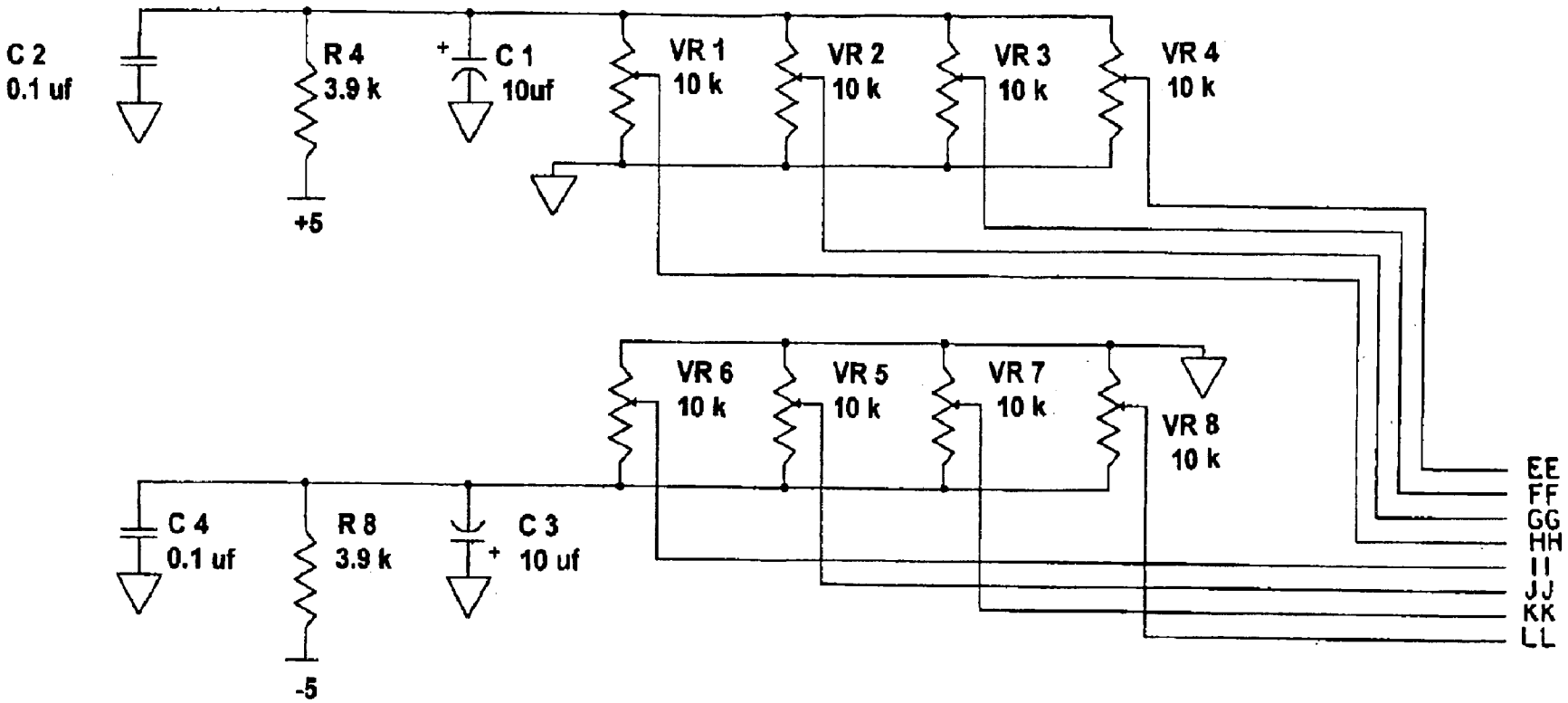
FIG. 5 is a schematic diagram of one embodiment of the PCM level adjustment.
Figure 6:
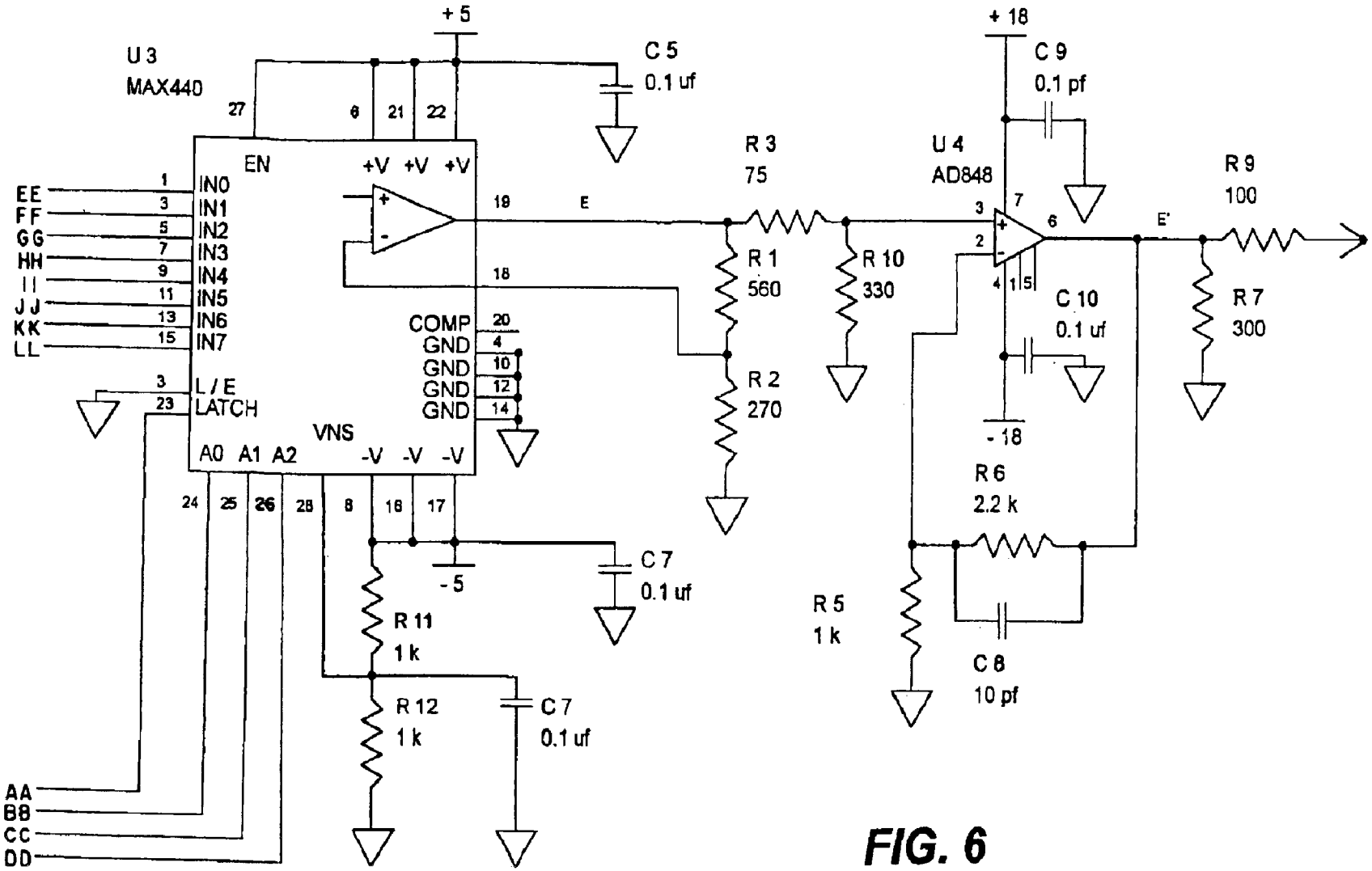
FIG. 6 is a schematic diagram of one embodiment of the wide-band analog multiplexer and the buffer amplifier.

In FIG. 2, transmitter 50 of the present invention comprises 2X Clock 70, PCM State Level Adjustment 80 (shown in more detail in FIG. 5), PCM State Detector and Multiplexer Controller 90 (shown in more detail in FIG. 4), Wide-bandwidth Analog Multiplexer 100 (shown in more detail in FIG. 6), and Buffer Amplifierl 10 (shown in more detail in FIG. 6). As mentioned earlier, input to transmitter 50 is Biphase PCM Waveform 60 (containing digital PCM data). At this point, biterror-rate is negligible and Signal C and Waveform 60 are essentially identical.

The PCM State Detector and MultiplexerController 90 performs the dual function of detecting the 8 possible MarkSpace and SpaceMark states of input Signal C and providing a corresponding multiplexer control signal to the Wide-bandwidth Analog Multiplexer 100. Responding to the multiplexer control signal, the Analog Multiplexer 100 is a wide-bandwidth multiplexer which selects a specific MarkSpace or SpaceMark mapping level. Adjustable DC voltages from the PCM State Level AdjustmerSO are selected by the Wide-bandwidth Analog Multiplexer 100 to map the detected, binary PCM Mark-Space or Space-Mark states of Signal C into new, variable step amplitude Mark-Space or SpaceMark levels to form the amplitude modulated PCM, Signal E. The mapped output, Signal E, from Multiplexer 100 is the input signal to Buffer Amplifierl 10, which provides buffering, impedance matching, and amplitude control for thepreemphasized signal to be subsequently transmitted through a single channel of Fixed Transmission Line 120. In FIG. 2, Signal E' is the amplified output signal from Buffer Amplifier 110; Signal E" is the attenuated output signal from the Fixed Transmission Line 120.

Figure 4:
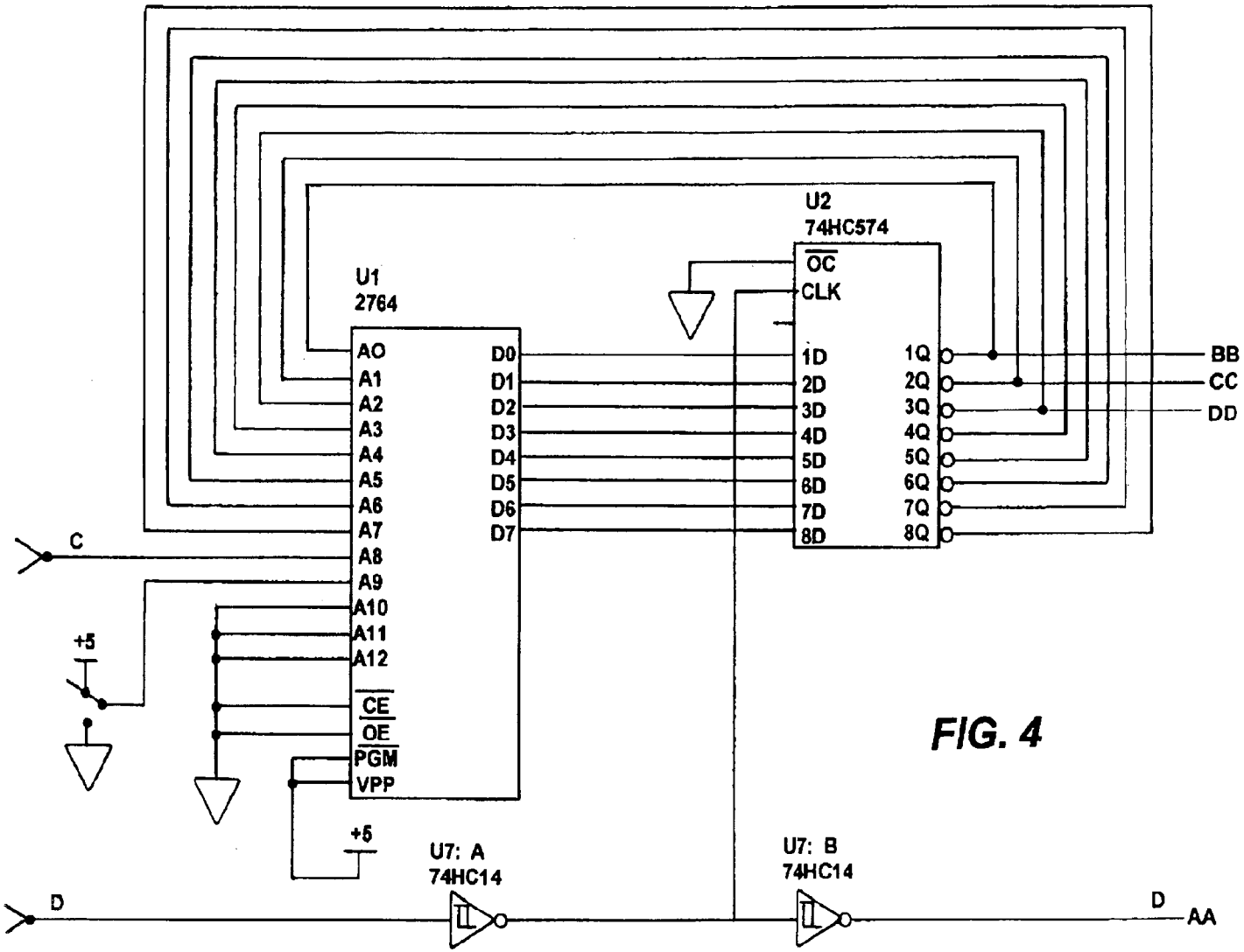
FIG. 4 is a schematic diagram of one embodiment of the PCM state detector and Multiplexer controller.

A preferred embodiment of PCM state Detector and Multiplexer Controller 120 is illustrated in FIG. 4 in circuit diagram schematic format. Signal C, i.e. the digital PCM data, Biphase PCM Waveform 60, is the input to Programmable Read-Only-Memory (PROM) U1, universal integrated circuit nomenclature 2764, or the like. This input is at address terminal A8 of PROM U1.

PROM U1 terminals, A10, A11, A12, CE, and OE are connected to the system ground bus. PROM U1 terminals PGM and VPP are connected to +5 VDC source of power. Appropriate connection of the integrated circuitry of the present invention for purposes of system grounding and sources of power are common and well known to those skilled in the art and will not be discussed hereinafter. Upon detection of a particular Mad-Space and Space-Mark state, a corresponding state detector signal is generated as output from PROM U1, on detector output terminals, D0, D1, D2, D3, D4, D5, D6, and D7, connected, respectively, to controller input terminals, 1 D, 2D, 3D, 4D, 5D, 6D, 7D, and 8D of Digital Latch U2, universal integrated circuit nomenclature 74HC574, or the like. These eight data lines represent the eight possible Mark-Space and Space-Mark states of the PCM signal, Signal C. PROM U1 and Digital LatchU2 are together configured as a serial shift register providing detection of the eight different Mark-Space and Space-Mark state conditions, listed hereinbefore, that can exist for the Signal C.

Signal D from the 2X Clock 70 is applied to Digital Latch U2 to synchronize identification of each of the eight possible Mark-Space and Space-Mark conditions of state that can exist in Signal C. As shown in FIG. 4, Signal D, a clock signal from 2X Clock 70, operating at twice the clock frequency of SignaB, is applied to the input of FirstInvertor U7A, universal integrated circuit nomenclature 74HC14, or the like. The output of the Fist Inverter U7A is applied both to the clocking terminal, CLK, of Digital Latch U2 and also to Second Inverter U713, universal integrated circuit nomenclature 74HC1 4, or the like. Output of Second Inverter U7B appears on Signal Line AA, reconstructed as Signal D (i.e. a double inversion of Signal D). From PROM U1, input address terminals, A0, A1, A2, A3, A4, A5, A6, and AT are connected respectively to controller output terminals, 1 Q, 2Q, 3Q, 4Q, 5Q, 6Q, 7Q, and 8Q, of Digital Latch U2. These connections enable the state detector control signal generated by Digital Latch U2 to feed back PROM U1 in order to detect the next condition of state of the serial data. This state detector control signal is presented as an address to PROW. The portion of the state detector control signal generated at controller output terminal 1Q appears on Signal Line BB; the portion of the state detector control signal generated at controller output terminal 2Q appears on Signal Line CC; and the portion of the state detector control signal generated at controller output terminal 3Q appears on Signal Line DD. These three output signals from 1 Q, 2Q, and 3Q of Digital Latch U2, appearing respectively on Signal Line BB, Signal Line CC, and Signal Line DD, plus Signal D (the 2X clock signal) appearing on Signal Line AA, comprise the multiplexed control signal which is applied to the multiplexer input terminals of the Widebandwidth Analog Multiplexer 100 (see FIG. 2 and FIG. 6) to control selection of a specific DC adjusted mapping voltage representing the amplitude of the one of eight possible Mark-Space and Space-Mark states of Signal IC. In this particular embodiment, Multiplexer 100 is represented in FIG. 6 as integrated circuit Multiplexer U3, universal integrated circuit nomenclature MAX440, or the like. The purpose of the output control signals utilized by MultiplexerU3 from outputs 1Q, 2Q, and 3Q of U2 is to select one of eight individually variable DC voltages representing an adjusted mappling amplitude of a specific Mark-Space or Space-Mark state condition.

These eight discrete DC voltage levels are determined by PCM State Level Adjustment 60, shown schematically for this embodiment as FIG. 5. Circuitry constituting Resistor R8, Resistor R4, Capacitor C1, Capacitor C2, Capacitor C3, and Capacitor C4 serves to provide voltage dividing from a source of DC power and also for suppression of transient noise. Such circuitry is well known by those practicing the art. Eight variable resistance devices, VR1, VR2, VR3, VR4, VR5, VR6, VR7, VR8, connected between a source of DC power and system ground, are manually adjusted to provide preemphasizer mapping voltages, respectively, to Mapping Voltage Line HH, Mapping Voltage Line GG, Mapping Voltage Line FF, Mapping Voltage Line EE, Mapping Voltage Line JJ, Mapping Voltage Line II, Mapping Voltage Line KK, and Mapping Voltage Line LL. These mapping voltage lines EE, FF, GG, HH, II, JJ, KK, LL serve as input, respectively, to IN0, IN1, IN2, IN3, IN4, IN5, IN6, and IN7, level adjustment input terminals of Multiplexer U3, shown in FIG. 6. These DC mapping voltages are individually and manually adjusted to compensate for frequency dependent attenuation of Signal E', upon transmission through Fixed Transmission Line 20, as represented herein by Signal E". Such frequency dependent transmission line loses occur because a Short Mark or Short Space features a higher frequency component than a Long Mark or Long Space, and consequently, yielding differing amplitudes at the output of the transmission line. Thus, the amplitude mapping of the higher frequency signal component must be of higher magnitude than that of the lower frequency signal component to compensate for the greater attenuation suffered in the transmission line.

In the preferred embodiment, calibration of PCM State Level Adjustment 20 to subsequently provide pre-emphasis amplitude mapping of Signal C into the digital pre-emphasized signal, Signal E, is accomplished by observing, with an appropriate measuring instrument, such as an oscilloscope, the received signal at the output of Wide-Band Amplifier 140 (see FIG. 2) and manually and individually adjusting the eight variable resistance devices, V13, VR 2, VR 3, VR 4, VR 5, VR 6, VR 7, and VR 8 of PCIVI State Level Adjustment 60 until the received signal features a constant amplitude. This procedure is not difficult and normally can be completed within three to five minutes by those of average skill in the art. Differences between Signal C and Signal E occur only in respect to individual amplitudes of the pulses, the width of such pulses does not differ; consequently, the original digital PCM data, represented as bi-phase PCM waveform 60, has not been altered.

In FIG. 6, the preemphasized mapped output signal of Multiplexer U3, represented as Signal E, is presented as an input signal to Buffer Amplified 10, Integrated Circuit Amplifier U4, universal integrated circuit nomenclature AD848, or the like. Additional circuitry concomitant with U4 includes, (1) a resistive network R1, R2, R3, and R 10, connected between the output of U3 and the input of U4, providing impedance matching and voltage dividing, and (2) a resistive network R7 and R9, connected between the output of U4 and input of Fixed Transmission Linel 20, providing impedance matching. Design and implementation of both networks are well known in the art, and are not further discussed. Shown in FIG. 2, the output of Buffer Amplified 10, an amplitude adjusted replication of Signal E, is Signal E', which is the input signal to Fixed Transmission Line 20. In like manner, the output signal from Fixed Transmission Line 20, an attenuated, frequency degraded version of Signal E', is Signal E", which is the input signal to Receiver 130.

As illustrated in FIG. 2, Signal " is applied as an input signal to Received 30, comprising Wide-Band Amplifier 140 and Threshold Detector 150. The design and implementation of circuitry for Wide-Band Amplifier 140 and Threshold Detector 150 are well known to those practicing the art. Both circuits are common and implementation is relatively inexpensive. The output of Receiver 130 is Reconstructed PCM Waveform 160, represented as Signal C'. With proper calibration of PCM State Level Adjustment 80, mentioned hereinbefore, the veracity of Signal C', compared to Signal C, can be made sufficient to perform the intended purpose and fulfill requisite operational characteristics of the aforementioned PCM data transmission system.

EXAMPLE 2

The present invention described hereinbefore provides the basic or elementary level of implementation of transmitting pre-emphasized PCM codes through cable. In a second, more sophisticated (and expensive) embodiment of the present invention, calibration of PCM State Level Adjustment 80 can be automatic, vice manual, using a microcontroller and additional digital electronics to provide for remote calibration of the circuit through the cable. This more technically advanced version allows the calibration process to be performed dynamically and at a remote facility.

As applied to the example of the oceanographic data system, the digital reemphasizer was located within pressure vessels which were submerged to depths of up to 5,000 meters of water (about 7500 meters of cable). Since retrieval of the pressure vessels was both labor-intensive and time consuming, it was important to enable calibration of the reemphasizer while deeply submerged. A cost effective solution entailed the implementation of a microcontroller, firmware, and the addition of more electronic components to the basic circuit. It should be noted also that the basic description and application is applied for use in bi-phase level PCM code. The invention can use other codes which simply require a differently coded PROM (U1,FIG. 4) depending on the code used. The Delayed Modulation family of codes can be utilized by simply adding an additional PROM to detect the inherent additional states in the Delayed Modulation code. There are a host of other codes which this invention can be used for preemphasis. Because of the simple nature of its use, the invention could be implemented into a Very Large Scale Integrated (VLSI) circuit which could provide for a single chip solution. Note also that this invention has commercial application in digital recording and in systems using data telemetry.

Although only a single exemplary embodiment of the invention has been described in detail above, those skilled in the art will readily appreciate that many modifications are possible in the exemplary embodiment without materially departing from the novel teachings and advantages of this invention. Accordingly, all such modifications are intended to be included within the scope of this invention as defined in the following claims. In the claims, means-plus-functions clauses are intended to cover the structures described herein as performing the recited functions and not only structural equivalents but also equivalent structures.

What is claimed is:

1. A digital preemphasizer for reducing a bit-error-rate during transmission of a pulse code modulator (PCM) code on a fixed transmission line, said preemphasizer comprising:

a receiver device for receiving, in a PCM state detector, a binary PCM data input signal containing said digital PCM data and having a plurality of input address terminals and corresponding detector output terminals, for detecting a Mark-Space and Space-Mark state of each portion of said data input signal, generating a corresponding state detector signal thereof, and supplying said state detector signal at said detector output terminals;

a multiplexer controller, having a plurality of controller input terminals and a corresponding number of controller output terminals;

a receiving device for receiving at said controller input terminals said state detector signal from said detector output terminals of said PCM state detector, for generating a multiplexer control signal and a state detector control signal, supplying said state detector control signal to said controller output terminal;

a device for applying said state detector control signal to said input address terminals of said state detector for controlling said state detector;

a wide-bandwidth analog multiplexer, having a plurality of level adjustment input terminals, a plurality of multiplexer input terminals, and a multiplexer output terminal;

a receiving device for receiving at said multiplexer input terminals said multiplexer control signal from said controller output terminals of said multiplexer controller, for mapping said Mark-space and Space-mark state of each portion of said data input signal into a preemphasized signal comprising a constituent, adjustable amplitude for each possible said state, and supplying said preemphasized signal at said multiplexer output terminal;

a 2X clock signal, derived from and operating at twice the frequency of the clock signal associated with said binary PCM data input signal;

a connecting device for connecting said 2X clock signal to both said multiplexer controller and said analog multiplexer, for timing and synchronizing the mapping of said Mark-space and Space-mark state of each portion of said data signal into said preemphasizer signal;

an adjustment device for generating a plurality of PCM state level adjustments, one level for each possible said Mark-space and Space-mark state, and having a corresponding number of state level adjustment output terminals with said level adjustments supplied thereon;

a device for connecting said level adjustments supplied at said state level adjustment output terminals to said level adjustment input terminals of said analog multiplexer, for reducing bit-error-rate of said digital PCM data by compensating for and mitigating frequency dependent attenuation intrinsic to a fixed transmission line;

a conductor device for connecting said preemphasized signal to the transmission line;

an adjustment device for providing amplitude adjustment of said preemphasized signal and impedance matching between said multiplexer output terminal of said wide-bandwidth analog multiplexer and said transmission line; and a device for receiving, detecting, and producing a low bit-error-rate replication of said binary PCM data input signal said preemphasizer signal upon passing through said transmission line, whereby said digital preemphasizer reduces the bit-error-rate during the transmission of digital PCM data or a fixed transmission line.

2. A preemphasizer, as in claim 1, wherein said PCM state level is adjusted manually, having a plurality of individually, manually adjustable DC voltage sources, equal in number to said plurality of possible states on the PCM signal.

3. A preemphasizer, as in claim 2, wherein said manual adjustment for PCM state level adjustment comprises a plurality of variable resistors, attached to a common source of DC voltage.

4. A preemphasizer, as in claim 3, further comprising a manual adjustment of said plurality of amplitude signals by observing and measuring the output signal amplitude from the wide-band amplifier of the receiver and manually, repeatedly, performing said adjustment until the amplitude is constant, indicating optimum settings for said adjustment for the transmission line.

5. A preemphasizer, as in claim 1, wherein said PCM state level adjustment is automatic, further comprising: a device for producing a plurality of individually, automatically adjustable DC voltage sources, equal in number to said plurality of possible states of the PCM input signal.

6. A preemphasizer, as in claim 4 or claim 5, wherein said plurality of input address terminals of said PCM state detector number eight, said plurality of possible states of said PCM signal number eight, said plurality of said state detector control signals number eight, and said plurality of preemphasizer output control signals number three.

7. A preemphasizer for reducing a bit error rate during transmission of pulse code modulator (PCM) code on a fixed transmission line, said preemphasizer comprising:

a state detector for receiving the PCM serial input signal, operatively connected thereto, and detecting a Mark or Space of each portion of the input signal thereof;

said detector means having a plurality of detector input address terminals and an equal number of detector output terminals;

a controller for providing a plurality of control signals for controlling said preemphasizer, said controller having controller input terminals, equal in number to said detector output terminals of said state detector and operatively connected thereto, said controller having output terminals equal in number to said detector input terminals of said state detector and operatively connected thereto, said controller having a plurality of output control signals present thereon;

multiplexer for receiving said output control signals on separate multiplexer input terminals, equal in number to the plurality of said output control signals from said controller, for mapping the plurality of possible states of the PCM controller signal into a preemphasized signal comprising an adjustable amplitude for each of said possible states, having said preemphasized signal as the output signal thereof;

clock for generating a 2X clock signal, derived from and operating at twice a frequency of a clock signal of the PCM signal, operatively sending a 2X clock signal to both said controller and said multiplexer, for timing and synchronizing said mapping of the PCM signal;

a level adjustment for generating a plurality of PCM state level adjustments, one level for each of said possible states, operatively connected to said multiplexer, for mitigating frequency dependent attenuation attendant to a fixed transmission line; and said preemphasizer signal, mapped from the PCM signal, thereon operatively connected to the input of a buffer amplifier, output of the buffer amplifier operatively connected to input of the transmission line, output of the transmission line operatively connected to a receiver, comprising a wide-band amplifier and a threshold detector thereof, the receiver producing as its output a replication of the PCM serial input signal, said preemphasizer reducing the bit error rate during transmission of the PCM serial input signal through the transmission line.

8. A digital preemphasizer comprising:

a pulse code modulator (PCM) state detector for receiving a PCM input signal, operatively connected thereto, and detecting a Mark or Space state of each portion of the input signal, said detector having a plurality of detector input address terminals and an equal number of detector output terminals;

a multiplexer controller for providing a plurality of control signals for controlling said preemphasizer, said controller having controller input terminals, equal in number to said detector output terminals of said state detector and operatively connected thereto, said controller having output terminals equal in number to said a detector input terminals of said state detector and operatively connected thereto, said controller having a plurality of output signals present thereon;

a wide-band analog multiplexer receiving said output control signals on separate multiplexer input terminals, equal in number to the plurality of said output control signals from said controller, for mapping the plurality of possible states of said PCM signal into a preemphasizer signal of adjustable and variable amplitude for each of said possible states, having said preemphasized signal as an output signal thereof;

a clock generating a 2X clock signal derived from and operating at twice a frequency of a clock signal of said PCM signal, operatively sending a 2X clock signal to both said controller and said multiplexer for timing and synchronizing said mapping of said PCM signal;

a plurality of adjustments for the PCM state level, one level for each of said possible states, operatively connected to said multiplexer for compensating for frequency dependent attenuation attendant to a fixed transmission line; and said preemphasizer signal mapped from the PCM signal, thereupon operatively connected to the input of a buffer amplifier, output of the buffer amplifier operatively connected to the input of the transmission line, output of the transmission line operatively connected to a receiver, comprising a wide-band amplifier and a threshold detector thereof, the receiver producing as its output a replication of the PCM serial input signal, said preemphasizer reducing the bit error rate during the transmission of the PCM input signal.

* * * * *